US010287185B2

United States Patent
Nickelsen et al.

(10) Patent No.: US 10,287,185 B2
(45) Date of Patent: May 14, 2019

(54) SUSTAINABLE SYSTEM AND METHOD FOR REMOVING AND CONCENTRATING PER- AND POLYFLUOROALKYL SUBSTANCES (PFAS) FROM WATER

(71) Applicant: Emerging Compounds Treatment Technologies, Inc., Burlington, MA (US)

(72) Inventors: Michael G. Nickelsen, Bloomfield, NY (US); Steven E. Woodard, Cumberland, ME (US)

(73) Assignee: Emerging Compounds Treatment Technologies, Inc., Burlington, MA (US)

( * ) Notice: Subject to any disclaimer, the term of this patent is extended or adjusted under 35 U.S.C. 154(b) by 18 days.

(21) Appl. No.: 15/477,350

(22) Filed: Apr. 3, 2017

(65) Prior Publication Data

US 2017/0297926 A1    Oct. 19, 2017

Related U.S. Application Data

(60) Provisional application No. 62/321,929, filed on Apr. 13, 2016.

(51) Int. Cl.
*C02F 1/42* (2006.01)
*C02F 101/36* (2006.01)
(Continued)

(52) U.S. Cl.
CPC ............ *C02F 1/42* (2013.01); *B01J 41/05* (2017.01); *B01J 41/12* (2013.01); *B01J 49/57* (2017.01);
(Continued)

(58) Field of Classification Search
CPC . B01D 15/00; B01D 35/00; C02F 1/58; C02F 1/42; C02F 2001/422
See application file for complete search history.

(56) References Cited

U.S. PATENT DOCUMENTS

2017/0297926 A1*  10/2017  Nickelsen ................. C02F 1/42

OTHER PUBLICATIONS

Dudley, L.M.B., "Removal of Perfluorinated Compounds by Powdered Activated Carbon, Superfine Powdered Activated Carbon, and Anion Exchange Resins", Master's Thesis, North Carolina State University, 2012, (one-hundred-eighty-five (185) pages).
Appleman, T.D. et al., "Treatment of Poly- and Perfluoroalkyl Substances in U.S. Full-Scale Water Treatment Systems", Water Research 51, 2014, pp. 246-255.
Chularueangaksorn, P. et al., "Regeneration and Reusability of Anion Exchange Resin Used in Perfluorooctane Sulfonate Removal by Batch Experiments", Journal of Applied Polymer Science, 2013, pp. 884-890.
(Continued)

*Primary Examiner* — Ana M Fortuna
(74) *Attorney, Agent, or Firm* — Iandiorio Teska & Coleman, LLP

(57) ABSTRACT

A sustainable system for removing and concentrating per- and polyfluoroallcyl substances (PFAS) from water. The system includes an anion exchange vessel having a selected anion exchange resin therein configured to remove PFAS from the water. A line coupled to the vessel introduces a flow of water contaminated with PFAS such that the PFAS bind to the selected anion exchange resin and are thereby removed from the water. A regenerant solution line is coupled to the anion exchange vessel to introduce an optimized regenerant solution to the anion exchange vessel to remove the PFAS from the anion exchange resin, thereby regenerating the anion exchange resin and generating a spent regenerant solution comprised of the removed PFAS and the optimized regenerant solution. A separation and recovery
(Continued)

subsystem recovers the optimized regenerant solution for reuse and separates and concentrates the removed PFAS.

30 Claims, 4 Drawing Sheets

(51) Int. Cl.
   *B01D 3/00* (2006.01)
   *B01J 41/05* (2017.01)
   *B01J 41/12* (2017.01)
   *B01J 49/57* (2017.01)
   *B01D 63/00* (2006.01)
   *B01L 1/00* (2006.01)
   *B01L 3/00* (2006.01)

(52) U.S. Cl.
   CPC . *B01L 1/00* (2013.01); *B01L 3/00* (2013.01); *C02F 2001/422* (2013.01); *C02F 2101/36* (2013.01)

(56) References Cited

OTHER PUBLICATIONS

Deng S., et el., "Removal of Perfluorooctane Sulfonate from Wastewater by Anion Exchange Resins: Effects of Resin Properties and Solution Chemistry", Water Research 44, 2010, pp. 5188-5195.

Du, Z., et al., "Adsorption Behavior and Mechanism of Perfluorinated Compounds on Various Adsorbents-A Review", Journal of Hazardous Materials, 274, 2014, pp. 443-454.

Rahman et al., "Behaviour and Fate of Perfluoroalkyl and Polyfluoroalkyl Substances (PFAS) in Drinking Water Treatment": A Review, Water Research 50, 2014, pp. 318-340.

Zaggia et al., "Polyfluorinated Organic Micropollutants Removal from Water by Ion Exchange and Adsorption", Chemical Engineering Transactions, vol. 43, 2015, pp. 2257-2262.

* cited by examiner

SUSTAINABLE SYSTEM AND METHOD FOR REMOVING AND CONCENTRATING PER- AND POLYFLUOROALKYL SUBSTANCES (PFAS) FROM WATER

RELATED APPLICATIONS

This application claims benefit of and priority to U.S. Provisional Application Ser. No. 62/321,929 filed Apr. 13, 2016, under 35 U.S.C. §§ 119, 120, 363, 365, and 37 C.F.R. § 1.55 and § 1.78, which is incorporated herein by this reference.

FIELD OF THE INVENTION

This invention relates to a sustainable system and method for removing and concentrating per- and polyfluoroalkyl substances (PFAS) from water.

BACKGROUND OF THE INVENTION

Per- and polyfluoroalkyl substances (PFAS) are a class of man-made compounds that have been used to manufacture consumer products and industrial chemicals, including, inter alia, aqueous film forming foams (AFFFs). AFFFs have been the product of choice for firefighting at military and municipal fire training sites around the world. AFFFs have also been used extensively at oil and gas refineries for both fire training and firefighting exercises. AFFFs work by blanketing spilled oil/fuel, cooling the surface, and preventing re-ignition. PFAS in AFFFs have contaminated the groundwater at many of these sites and refineries, including more than 100 U.S. Air Force sites.

PFAS may be used as surface treatment/coatings in consumer products such as carpets, upholstery, stain resistant apparel, cookware, paper, packaging, and the like, and may also be found in chemicals used for chemical plating, electrolytes, lubricants, and the like, which may eventually end up in the water supply.

PFAS are bio-accumulative in wildlife and humans because they typically remain in the body for extended periods of time. Laboratory PFAS exposure studies on animals have shown problems with growth and development, reproduction, and liver damage. In 2016, the U.S. Environmental Protection Agency (EPA) issued the following health advisories (HAs) for perfluorooctanesulfonic acid (PFOS) and perfluorooctanoic acid (PFOA): 0.07 µg/L for both the individual constituents and the sum of PFOS and PFOA concentrations, respectively. Additionally, PFAS are highly water soluble in water, result in large, dilute plumes, and have a low volatility.

PFAS are very difficult to treat largely because they are extremely stable compounds which include carbon-fluorine bonds. Carbon-fluorine bonds are the strongest known bonds in nature and are highly resistant to breakdown.

The vast majority of available conventional water treatment systems and methods to remove PFAS from water have proven to be ineffective. See e.g., Rahman, et al., *Behaviour and Fate of Perfluoroalkyl and Polyfluoroalkyl Substances (PFASs) in Drinking Water Treatment*, Water Research 50, pp. 318-340 (2014), incorporated by reference herein. Conventional activated carbon adsorption system and methods to remove PFAS from water have shown to be somewhat effective on the longer-chain PFAS, but have difficulty in removing branched and shorter chain compounds, see e.g. Dudley, Master's Thesis: *Removal of Perfluorinated Compounds by Powdered Activated Carbon, Superfine Powdered Activated Carbon, and Anion Exchange Resins*, North Carolina State University (2012), incorporated by reference herein.

Appleman et al., *Treatment of Poly-and Perfluoroalkly Substances in U.S. Full-Scale Treatment Systems*, Water Research 51, pp. 246-255 (2014), incorporated by reference herein, reported that, similar to activated carbon, some conventional anion exchange resins may be more effective at treating longer chain PFAS than the shorter chain compounds. Other conventional anion exchange resins have shown some success in removing a broader range of PFAS, including the shorter-chain compounds, see e.g., Dudley, cited supra.

Conventional anion exchange treatment systems and methods typically utilize anion exchange resin where positively charged anion exchange resin beads are disposed in a lead vessel which receives a flow of water contaminated with anionic contaminants, such as PFAS. The negatively charged contaminants are trapped by the positively charged resin beads and clean water flows out of the lead anion exchange vessel into a lag vessel, also containing anion exchange resin beads. A sample tap is frequently used to determine when the majority of the anion exchange beads in the lead exchange vessel have become saturated with contaminants. When saturation of the resin anion exchange beads is approached, a level of contaminants will be detected in the effluent tap. When this happens, the lead vessel is taken off line and the contaminated water continues flowing to the lag vessel which now becomes the lead vessel. The lead-lag vessel configuration ensures that a high level of treatment is maintained at all times.

As discussed above, some conventional anion exchange resins can also be used to remove PFAS from water. A number of known methods exist to regenerate the anion exchange beads in the anion exchange vessel. Some known methods rely on flushing the resin with a brine or caustic solution. Other known methods may include the addition of solvents, such as methanol or ethanol, to enhance the removal of the PFAS trapped on the anion exchange beads. Effective resin regeneration has been demonstrated by passing a solvent (e.g., methanol or ethanol), blended with a sodium chloride or sodium hydroxide solution, through the resin. See e.g., Deng et al., *Removal of Perfluorooctane Sulfonate from Wastewater by Anion Exchange Resins: Effects of Resin Properties and Solution Chemistry*, Water Research 44, pp. 5188-5195 (2010) and Chularueangaksom et al., *Regeneration and Reusability of Anion Exchange Resin Used in Perfluorooctane Sulfonate Removal by Batch Experiments*, Journal of Applied Polymer Science, 10.1002, pp. 884-890 (2013), both incorporated by reference herein. However, such methods may generate a large amount of toxic regenerant solution which must be disposed of at significant expense.

Du et al., *Adsorption Behavior and Mechanism of Perfluorinated Compounds on Various Adsorbents—A Review*, J. Haz. Mat. 274, pp. 443-454 (2014), incorporated by reference herein, discloses a need to further treat the waste regenerant solution to concentrate the PFAS and reduce the volume of waste. This is a key step, because resin regeneration produces a significant volume of toxic waste.

The known methods for removing PFAS from water discussed above typically do not optimize the anion exchange resin and may have limited capacity for removing PFAS mass. Such known methods may also incompletely regenerate the anion exchange resin by attempting to desorb the PFAS from the resin. Such known methods may incompletely regenerate the anion exchange resin which may lead to a loss of capacity, otherwise known as active sites, during each successive loading and regeneration cycle. This cumulative buildup of PFAS on the ion exchange resin is often referenced to as a "heel," and results in reduced treatment effectiveness as the heel builds up over time. Such known methods may also not reclaim and reuse the spent regenerant solution which may increase the amount spent regenerant solution with removed PFAS therein. This increases the amount of toxic spent regenerant solution with PFAS, which must be disposed of at significant expense.

Conventional systems and methods for attempting to remove PFAS also include biological treatment, air stripping, reverse osmosis, and advanced oxidation. All of these conventional techniques are ineffective and/or extremely expensive.

BRIEF SUMMARY OF THE INVENTION

In one aspect, a sustainable system for removing and concentrating per- and polyfluoroalkyl substances (PFAS) from water is featured. The system includes an anion exchange vessel including a selected anion exchange resin therein configured to remove PFAS from the water. A line coupled to the vessel is configured to introduce a flow of water contaminated with PFAS such that the PEAS bind to the selected anion exchange resin and are thereby removed from the water. A regenerant solution line coupled to the anion exchange vessel is configured to introduce an optimized regenerant solution to the anion exchange vessel to remove the PFAS from the anion exchange resin thereby regenerating the anion exchange resin and generating a spent regenerant solution comprised of the removed PFAS and the optimized regenerant solution. A separation and recovery subsystem is configured to recover the optimized regenerant solution for reuse and separate and concentrate the removed PFAS.

In one embodiment, the PFAS may be removed from the anion exchange resin by a dual mechanism including desorption and anion exchange. The desorption may include providing the optimized regenerant solution having a predetermined concentration of a solvent configured to displace adsorbed hydrophobic tails of PFAS from the backbone of the anion exchange resin with the solvent and providing a predetermined concentration of salt or base configured to displace hydrophilic heads of PFAS with inorganic anions. The optimized regenerant solution may include a mixture of a salt or a base, a solvent, and water. The solvent may include an alcohol. The optimized regenerant solution may include about 50% to about 90% methanol by volume, about 10% to about 50% water by volume, and about 1% to about 5% salt or base by weight. The optimized regenerant solution may include about 70% methanol by volume, about 28% water by volume, and about 2% salt or base by weight. The selected anion exchange resin may include a macroporous, strong base, anion exchange resin. The separation and recovery subsystem may include one or more of: an evaporation subsystem, a distillation subsystem and/or a membrane separation subsystem. The system may include a condenser coupled to the evaporation or distillation unit configured to condense the reclaimed regenerant solution. The separation and recovery subsystem may include a solvent purification subsystem configured to remove carryover PFAS from the separation and recovery subsystem and to provide a purified, reclaimed solvent for reuse. The solvent purification subsystem may include anionic exchange resin housed in a vessel. The separation and recovery subsystem may include a super-loading recovery subsystem configured to create an ultra-concentrated PFAS waste product and a solution of concentrated salt or base and water for reuse. The super-loading recovery subsystem may include an anionic exchange resin housed in a vessel. The super-loading recovery subsystem may be configured to provide purified reclaimed water and purified reclaimed salt or base for reuse.

In another aspect, a sustainable method for removing and concentrating per- and polyfluoroalkyl substances (PFAS) from water is featured. The method includes selecting an anion exchange resin configured to remove PFAS and provide treated water, adding the selected anion exchange resin to an anion exchange vessel, introducing a flow of water contaminated with PFAS to a vessel such that the PFAS bind to the selected anion exchange resin and are thereby removed from the water, introducing an optimized regenerant solution to the anion exchange vessel to remove the PFAS from the anion exchange resin thereby regenerating the anion exchange resin and generating a spent regenerant solution comprised of removed PFAS and the optimized regenerant solution, and subjecting the spent regenerant solution to a separation and recovery process to recover the optimized regenerant solution for reuse and separate and concentrate the removed PFAS.

In one embodiment, the PFAS may be removed from the anion exchange resin by a dual mechanism including desorption and anion exchange. The desorption may include providing a predetermined concentration of a solvent configured to displace hydrophobic tails of the PFAS on the backbone of the anion exchange resin with the solvent and providing a predetermined concentration of anions configured to displace hydrophilic heads of the PFAS with the anions. The optimized regenerant solution may include a mixture of a salt or a base, a solvent, and water. The solvent may include an alcohol. The optimized regenerant solution may include about 50% to about 70% methanol by volume, about 2% to about 28% water by volume, and about 1% to about 5% salt or base by weight. The optimized regenerant solution may include about 70% methanol by volume, about 28% water by volume, and about 2% salt or base by weight.

The selected anion exchange resin may include a macroporous, strong base, anion exchange resin. The separation and recovery process may be configured to maximize recovery of optimized regenerant solution and minimize volume of concentrated desorbed PFAS. The separation and recovery process may include one or more of evaporation, distillation and membrane separation. The evaporation or vacuum distillation may include condensing the spent regenerant solution. The separation and recovery process may include removing carryover PFAS to provide a purified reclaimed solvent for reuse. The separation and recovery subsystem may include creating an ultra-concentrated PFAS waste product and a solution of concentrated salt or base and water for reuse.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
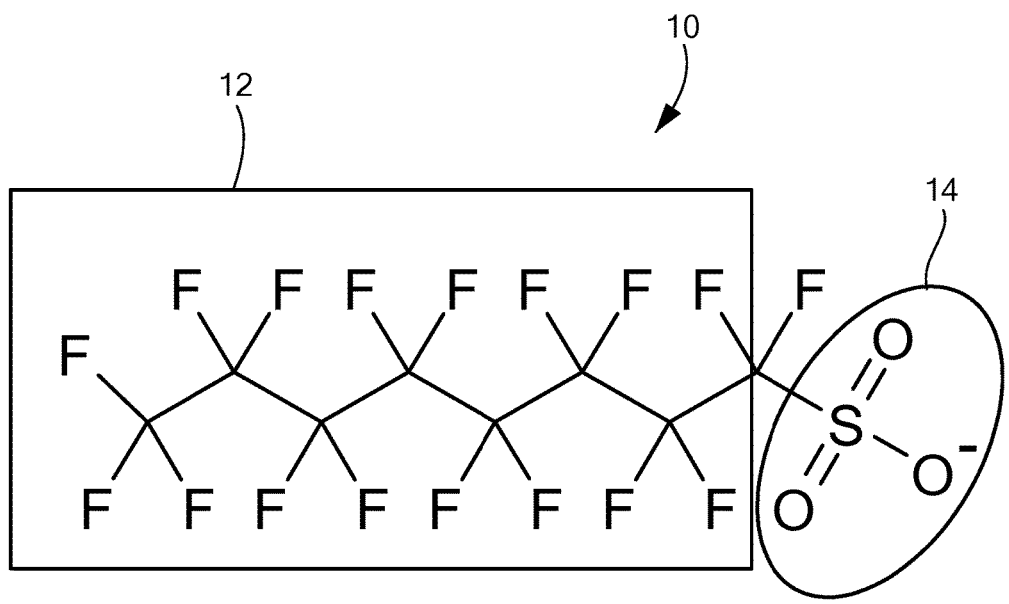
FIG. 1 shows an example of a typical PFAS with a hydrophobic non-ionic tail and an anionic head.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

As discussed in the Background section, anion exchange resins are highly effective at removing PFAS from water because of the multiple removal methods involved. The molecular structure of most PFAS compounds can be broken into two functional units including the hydrophobic non-ionic "tail," comprised of the fluorinated carbon chain and the hydrophilic anionic "head," having a negative charge. FIG. 1 shows an example of a typical PFAS 10 with hydrophobic non-ionic tail 12 and hydrophilic anionic head 14, in this example, a sulfonate group, although anionic head 14 may be a carboxylate group or similar type group.

Figure 2:
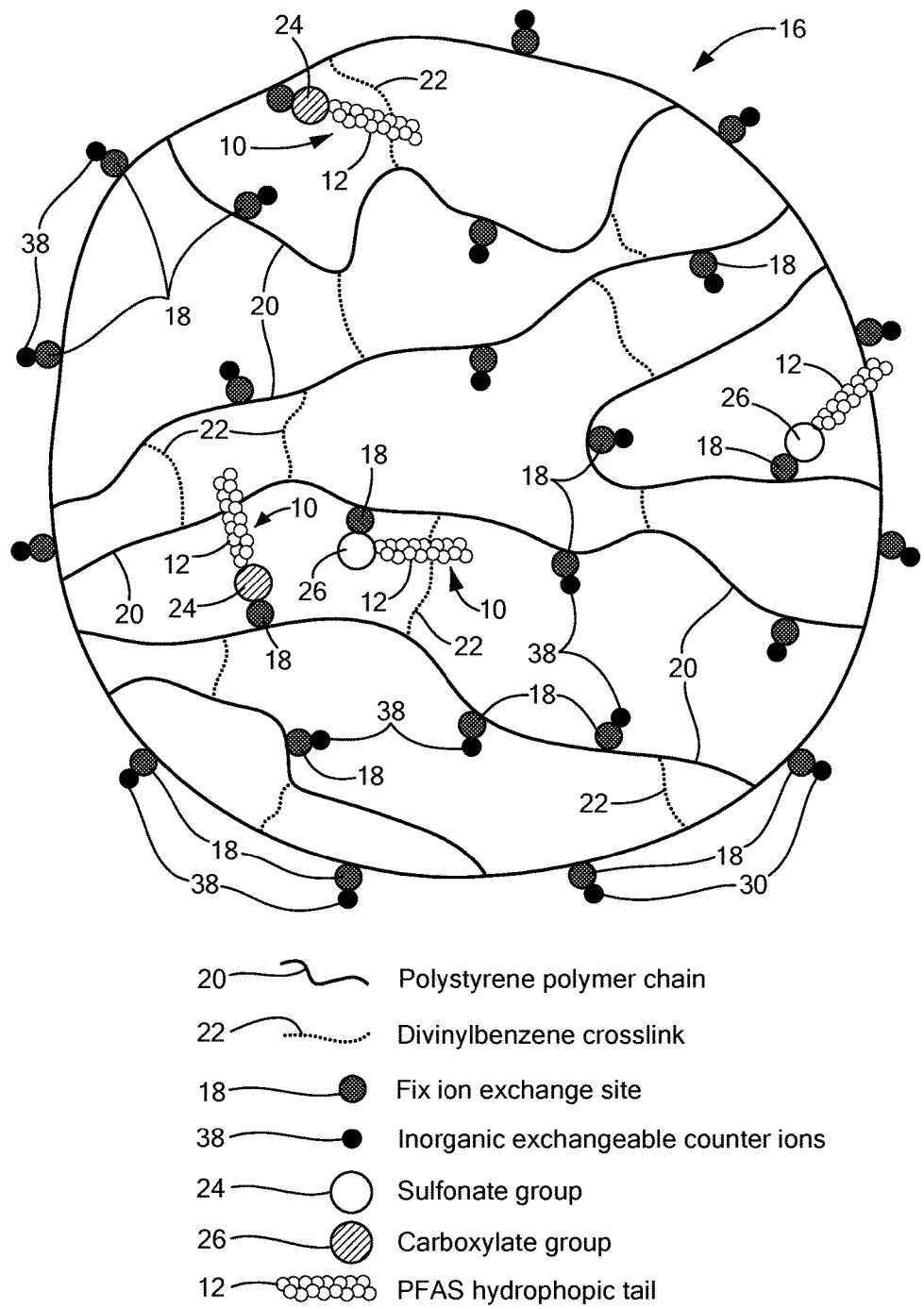
FIG. 2 shows a three-dimensional view depicting the complex three-dimensional structure of a typical anion exchange resin bead showing examples of positively charged exchange sites of the resin bead binding to negatively charged hydrophilic heads of PFAS molecules, and the hydrophobic carbon-fluorine tails of the PFAS adsorbing to the hydrophobic backbone of the resin bead.

Anion exchange resins are essentially adsorbents with anion exchange functionality. The resin beads are typically composed of neutral copolymers (plastics) that have positively charged exchange sites. FIG. 2 shows an example of the complex three-dimensional structure of a typical anion exchange resin bead 16 with positively charged exchange sites exemplarily indicated at 18. Anion exchange resins tend to be effective at removing PFAS from water because they take advantage of the unique properties of both the anion exchange resin bead and the perfluorinated contaminants, or PFAS, using a dual mechanism of adsorption and anion exchange. For example, hydrophobic carbon-fluorine tail 12, FIGS. 1 and 2, of PFAS 10 adsorbs to the hydrophobic backbone on anion exchange resin 16, FIG. 2, comprised of cross-linked polystyrene polymer chains, exemplarily indicated at 20 and divinylbenzene cross-links exemplarily indicated at 22. The negatively-charged hydrophilic heads 24 (sulfonate groups) or 26 (carboxylate groups) of PFAS 10 are attracted to positively-charged anion exchange sites 18 on anion exchange resin bead 16. The negatively charged heads 24, 26 of PFAS 10 displaces exchangeable inorganic counter ion 38, e.g., a chloride ion which is provided on anion exchange bead 18 when it is manufactured. The hydrophobic, uncharged carbon-fluorine tails 12 are adsorbed to the uncharged hydrophobic backbone comprised of polystyrene polymer chain 20 and divinylbenzene crosslink 22 via Van der Waals forces as shown.

Depending on the specific properties of both resin bead 16 and the PFAS 10, this dual mechanism of removal may be highly effective at removing PFAS from water and certain anion exchange resins have very high removal capacity for PFAS from water.

While the dual mechanism of PFAS removal discussed above may be highly effective at removing PFAS from water because the adsorption of the hydrophobic tails of the PFAS to the hydrophobic backbone of the anion resin exchange bead, it also makes resin regeneration and reuse more difficult. A high concentration of a brine or base solution, e.g., a solution of a salt, such as NaCl, and water, or a solution of a base, such as NaOH and water, may be used to effectively displace the anionic head of the PFAS from the anion exchange site of the anion exchange resin bead, but the hydrophobic carbon-fluorine tail tends to stay adsorbed to the resin backbone. Similarly, an organic solvent, e.g., methanol or ethanol, may be used to effectively desorb the hydrophobic tail from the backbone, but then the anionic head of the PFAS stays attached to the resin anion exchange site. Research to date has demonstrated that effective regeneration techniques must overcome both mechanisms of attraction. Solutions combining organic solvents and a salt or base, such as NaCl or NaOH, have shown the most successful results to date, e.g., as disclosed in Deng et al., 2010, and Chularueangaksorn et al., 2013, discussed in the Background section. Other research has focused on using combinations of ammonium salts, including ammonium hydroxide and ammonium chloride, e.g., as disclosed by Conte et al., *Polyfluorinated Organic Micropollutants Removal from Water by Ion Exchange and Adsorption*, Chemical Engineering Transactions, Vol. 43 (2015), incorporated by reference herein.

Figure 3:
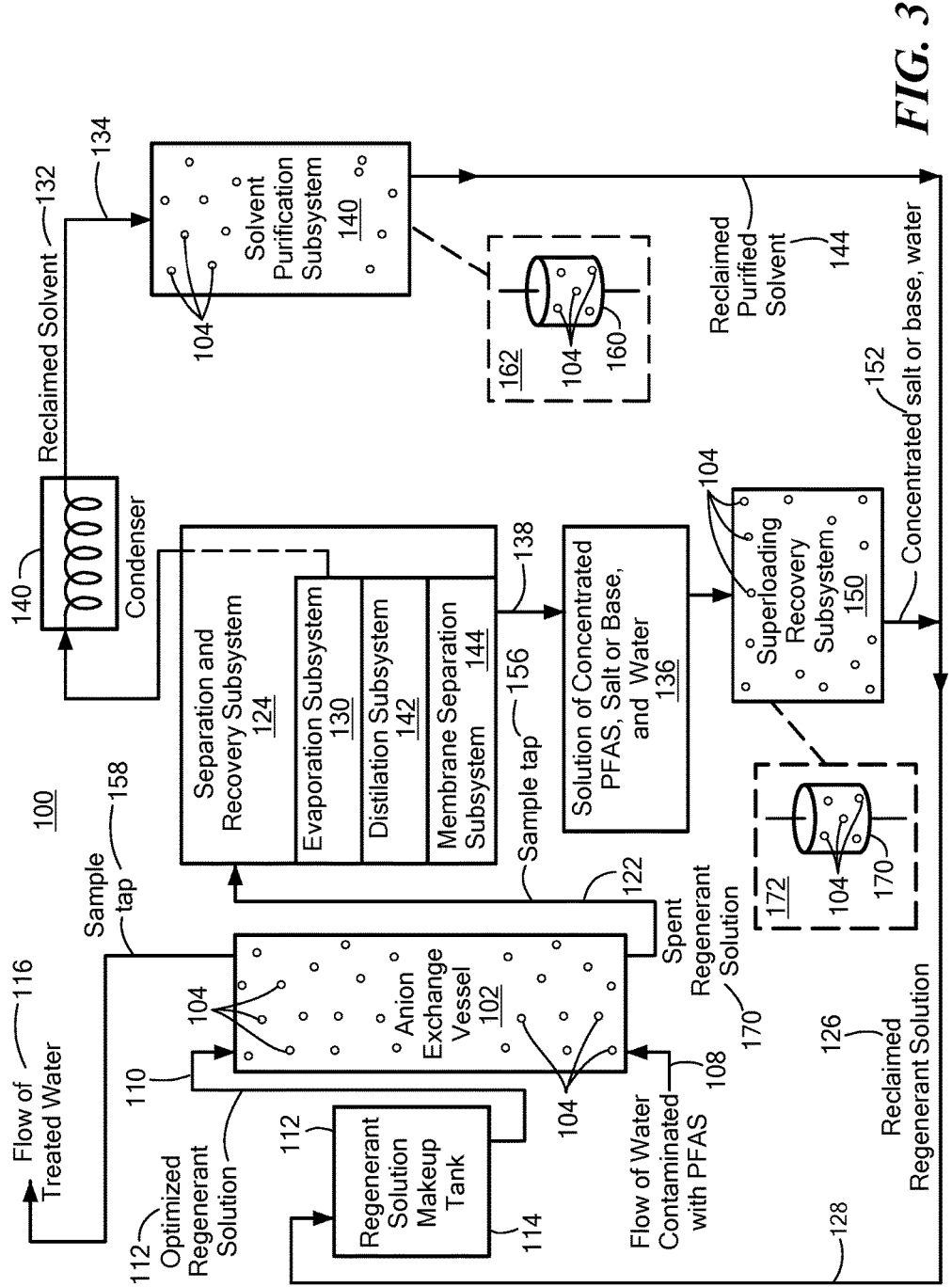
FIG. 3 is a schematic block diagram showing the primary embodiments of one embodiment of sustainable system and method for removing and concentrating PFAS from water.

There is shown in FIG. 3, one embodiment of sustainable system 100 for removing and concentrating PFAS from water. System 100 includes anion exchange vessel 102 including a selected anion exchange resin therein, exemplarily indicated at 104, configured to remove PFAS from flow of water 106 contaminated with PFAS. System 100 also includes line 108 which is configured to introduce flow of water 108 contaminated with PFAS into anion exchange vessel 102 such that the PFAS binds to selected anion exchange resin 104 and are removed from the water to provide flow of treated water 116. In one example, selected anion exchange resin 104 is preferably configured to be small, e.g., about 0.5 mm to about 1 mm diameter beads made of an organic polymer substrate or similar material which is preferably porous and provides a high surface area. Exemplary selected anion exchange resins may include Dow® AMBERLITE™, IRA958 Cl, DOWEX™ PSR-2, Dow® XUS-43568.00, and similar type anion exchange resins.

System 100 also includes regenerant solution line 110 coupled to anion exchange vessel 102 configured to introduce optimized regenerant solution 112 into anion exchange vessel 102 to remove the PFAS from anion exchange resin 104 to regenerate anion exchange resin 104 and generate spent regenerant solution 120 in line 122 comprised of removed PFAS and optimized regenerant solution. In one example, optimized regenerant solution 112 is made in regenerant solution make-up tank 114 coupled to regenerant solution line 110 as shown. In one design optimized regenerant solution 112 preferably includes a mixture of a salt or base, e.g., sodium chloride (NaCl) or sodium hydroxide (NaOH), a solvent and water. In one example, the solvent may include an alcohol or similar type solvent. In one example, optimized regenerant solution 112 includes about 50% to about 90% methanol by volume, about 10% to about 50% water by volume, and about 1% to about 5% salt or base by weight. In another example, optimized regenerant solution includes about 70% methanol by volume, about 28% water by volume, and about 2% salt or base by weight. As discussed above, preferably, selected anion exchange resin 104 and regenerant solution 112 removes PFAS from water by a dual mechanism including desorption and ion exchange. For ion exchange removal of PFAS from selected anion exchange resin 104, the anion of the salt or base, e.g., chloride of the NaCl or the hydroxide group of NaOH of optimized regenerant solution 112 displaces the hydrophilic heads 24 or 26, FIG. 2, of PFAS 10 on exchange sites 18 of anion exchange resin 16 due to the high concentration of the anions in optimized regenerant solution 112. For desorption, the solvent, e.g., an alcohol, such as methanol, ethanol or similar type alcohol of the optimized regenerant solution 112 displaces hydrophobic carbon tails 12 of the PFAS 112 bonded to the backbone of anion exchange resin 16 due to the high concentration of the solvent in optimized regenerant solution 112. The result is system 100 and efficiently removes both large and small chain PFAS from water.

In one example, the PFAS removed by anion exchange resin 14 may include Perfluorobutyric acid (PFBA), Perfluoropentanoic acid (PFPeA), Perfluorobutane sulfonate (PFBS), Perfluorohexanoic acid (PFHxA), Perfluoroheptanoic acid (PFHpA), Perfluorohexane sulfonate (PFHxS), 6:2 Fluorotelomer sulfonate (6:2 FTS), Perfluorooctanoic acid (PFOA), Perfluoroheptane sulfonate (PFHpS), Perfluorooctane sulfonate (PFOS), Perfluorononanoic acid (PFNA), 8:2 Fluorotelomer sulfonate (8:2 FTS).

System 100 also includes the separation and recovery system 124 coupled to line 122 which recovers optimized regenerant solution 120 for reuse as reclaimed regenerant solution 126 by line 128 coupled to line 110 and preferably to regenerant solution makeup tank 114. In one design, separation and recovery subsystem 124 provides reclaimed solvent 132 by line 128 as shown and solution 136 of concentrated PFAS, salt or base, and water by line 138 which is coupled to line 128 as shown. The PFAS in solution 138 is removed (discussed below) to provide solution 152 of concentrated salt or base and water output by line 138 coupled to line 128. Thus, reclaimed regenerant solution 126 preferably includes reclaimed solvent 132 and reclaimed salt or base and water.

In one design, separation and recovery subsystem 124 may include evaporation subsystem 130. In this example, spent regenerant solution 120 is subjected to evaporation by evaporation subsystem 130 to produce reclaimed solvent 132 output to line 128 and solution 136 of concentrated desorbed PFAS 36, salt or base and water. Condenser 140 may be utilized to condense reclaimed solvent 132. In another example, separation and recovery subsystem 124 may include one or more of a distillation subsystem 142 and/or a membrane separation subsystem 144 which similarly produce reclaimed solvent 132 for reuse by lines 128 and 110 and solution 136 of concentrated PFAS, salt or base, and water.

In one example, separation and recovery subsystem 124 may further include solvent purification subsystem 140 coupled to line 128 which removes carryover PFAS from separation and recovery subsystem 124 and provides purified reclaimed solvent 144 in line 128 for reuse as regenerant solution 112 via regenerant solution makeup tank 114 and regenerant solution line 110. In one example, solvent purification subsystem 140 is a small vessel, e.g., vessel 160 shown in caption 162 as shown having anion exchange resin 104 therein which removes carryover PFAS in line 134 to create concentrated PFAS in the vessel. When vessel 160 becomes saturated with PFAS, it can be removed and taken off-site for destruction.

Separation and recovery subsystem 122 may also include super-loading recovery subsystem 150 coupled to line 138 output by separation and recovery subsystem 124 having solution 136 of concentrated PFAS, salt or base, and water. Superloading recovery subsystem 130 creates ultra-concentrated PFAS waste product adsorbed to anion exchange resin 104 and concentrated salt or base or caustic water solution 152 purified for reuse. Super-loading recovery subsystem 150 preferably provides solution 152 of concentrated salt or base and water coupled to line 128 for reuse as regenerant solution 112 via regenerant solution makeup tank 114 and regenerant solution line 112. In one example, superloading and recovery subsystem 150 is a small vessel, e.g., vessel 170 in caption 172 as shown having anion exchange resin therein which provides ultra-concentrated PFAS on anion exchange resin 104 and outputs solution 152 of concentrated salt or base and water. When vessel 170 becomes saturated with PFAS, it can be removed and taken off-site for distribution. The small size and high concentration of PFAS reduces costs associated with removal of PFAS from water.

System 100 also preferably includes sample tap 156 or 158 as shown for testing the level of PFAS in treated water 116. When PFAS are detected in treated water 116, it means anion exchange resin 104 in vessel 102 has been saturated with PFAS attached to anion exchange resin 104 and anion exchange resin 104 need to be regenerated.

Figure 4:
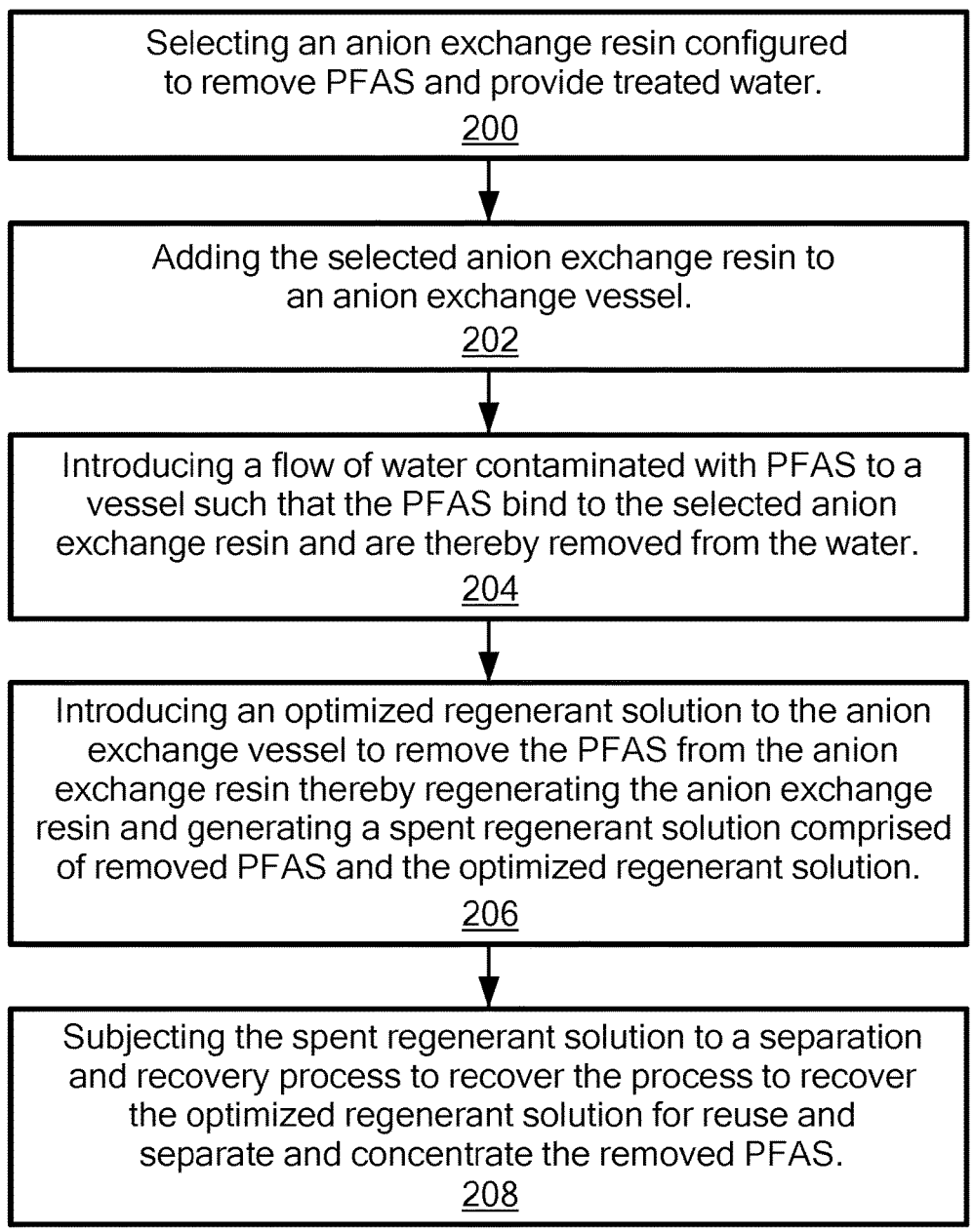
FIG. 4 is a block diagram showing the primary steps of one embodiment of the sustainable method for removing and concentrating PFAS from water.

The sustainable method for removing concentrated per- and polyfluoroalkyl substances (PFAS) from one embodiment of this invention may include selecting an anion exchange resin configured to move PFAS and provide clean, treated water, step 200, FIG. 4. The selected anion exchange resin is then added to an anion exchange vessel, step 202. A flow of water contaminated with PFAS is introduced to the anion exchange vessel such that the PFAS bind to the selected anion exchange resin and are thereby removed from the water, step 204. An optimized regenerant solution is introduced to the anion exchange vessel to desorb PFAS from the anion exchange resin thereby regenerating the anion exchange resin and generating a spent regenerant solution comprised of desorbed PFCs and the optimized regenerant solution, step 206. The spent regenerant solution is then subjected to a separation and recovery process to recover the optimized regenerant solution for reuse and separate and concentrate the removed PFAS.

The result is that system 100, and the method thereof for removing and concentrating PFAS from water, efficiently and effectively removes PFAS from water, regenerates the anion exchange resin and then concentrates, or ultra concentrates, the desorbed PFAS with a solvent purification subsystem and/or on super-loading recovery subsystem in small vessels that can be inexpensively disposed of. Thus, system 100 and the method thereof provides a sustainable system and method for concentrating and removing PFAS from water and regenerating the selected anion exchange resin, which significantly reduces the cost to remove PFAS from water because it generates less toxic waste than conventional and known methods for removing PFAS. The separated and concentrated or ultra-concentrated PFAS is easier and less expensive to handle and transport. System 100 and the method thereof efficiently reclaims the solvent, salt or base, and water from the spent regenerant solution which further reduces cost.

Although specific features of the invention are shown in some drawings and not in others, this is for convenience only, as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

What is claimed is:

1. A system for removing and concentrating per- and polyfluoroalkyl substances (PFAS) from water, the system comprising:
   an anion exchange vessel, including an anion exchange resin therein configured to remove PFAS from the water;
   a line coupled to the anion exchange vessel, configured to introduce a flow of water contaminated with PFAS such that the PFAS bind to the anion exchange resin in the anion exchange vessel and are thereby removed from the water;
   a regenerant solution line coupled to the anion exchange vessel configured to introduce a regenerant solution comprising a solvent, water, and a salt and/or a base to the anion exchange vessel to remove the PFAS from the anion exchange resin in the anion exchange vessel, thereby regenerating the anion exchange resin and generating a spent regenerant solution comprising the removed PFAS and regenerant solution;
   a separation and recovery subsystem configured to receive the spent regenerant solution and separate and concentrate the removed PFAS to produce:
      a reclaimed solvent having a concentration of the solvent that is greater than a concentration of the solvent in the spent regenerant solution, and
      a solution comprising removed PFAS, salt and/or base, and water, the solution having a concentration of removed PFAS that is greater than a concentration of removed PFAS in the spent regenerant solution and the solution having a concentration of the salt and/or base that is greater than a concentration of the salt and/or base in the spent regenerant solution; and
   a super-loading recovery subsystem configured to receive the solution comprising removed PFAS, salt and/or base, and water and to separate removed PFAS from the solution byadsorbing removed PFAS onto additional anion exchange resin to create an ultra-concentrated PFAS waste product.

2. The system of claim 1 in which the PFAS is removed from the anion exchange resin in the anion exchange vessel by a dual mechanism including desorption and anion exchange.

3. The system of claim 2 in which the desorption includes providing the regenerant solution having a concentration of a solvent configured to displace the adsorbed hydrophobic tails of PFAS from the backbone of the anion exchange resin in the anion exchange vessel with the solvent, and providing a concentration of salt and/or base configured to displace hydrophilic heads of PEAS with inorganic anions.

4. The system of claim 1 in which the solvent includes an alcohol.

5. The system of claim 4 in which the regenerant solution includes about 50% to about 90% methanol by volume, about 10% to about 50% water by volume, and about 1% to about 5% salt or base by weight.

6. The system of claim 5 in which the regenerant solution includes about 70% methanol by volume, about 28% water by volume, and about 2% salt or base by weight.

7. The system of claim 1 in which the anion exchange resin in the anion exchange vessel includes a macroporous, strong base, anion exchange resin.

8. The system of claim 1 in which the separation and recovery subsystem includes one or more of: an evaporation subsystem, a distillation subsystem, and/or a membrane separation subsystem.

9. The system of claim 8 in which the separation and recovery subsystem includes one or more of an evaporation subsystem and/or a distillation subsystem, and further including a condenser coupled to the evaporation subsystem and/or the distillation subsystem, the condenser configured to condense the reclaimed solvent.

10. The system of claim 1 further including a solvent purification subsystem configured to remove carryover PFAS from the separation and recovery subsystem and to provide a purified, reclaimed solvent.

11. The system of claim 10 in which the solvent purification subsystem includes anionic exchange resin housed in a vessel.

12. The system of claim 1 in which the super-loading recovery subsystem is configured to create a solution of salt and/or base and water, wherein a concentration of the salt and/or base in the solution created by the super-loading recovery subsystem is greater than a concentration of the salt and/or base in the solution comprising removed PFAS, salt and/or base, and water received by the super-loading recovery subsystem.

13. The system of claim 12 further comprising a line connecting the super-loading recovery subsystem to the anion exchange vessel and configured such that the solution of salt and/or base and water produced by the super-loading recovery subsystem can be transported from the super-loading recovery subsystem to the anion exchange vessel.

14. The system of claim 1 in which the super-loading recovery subsystem includes the additional anionic exchange resin housed in a vessel.

15. A method for removing and concentrating per- and polyfluoroalkyl substances (PFAS) from water, the method comprising:
   introducing water contaminated with PFAS to an anion exchange vessel including an anion exchange resin therein such that the PFAS bind to the anion exchange resin and are thereby removed from the water;
   introducing a regenerant solution comprising a solvent, water, and a salt and/or a base to the anion exchange vessel to remove the PFAS from the anion exchange resin thereby regenerating the anion exchange resin and generating a spent regenerant solution comprising removed PFAS and the regenerant solution; and
   subjecting the spent regenerant solution to a separation and recovery process in which removed PFAS is separated and concentrated to produce:

a reclaimed solvent having a concentration of the solvent that is greater than a concentration of the solvent in the spent regenerant solution, and a solution comprising removed PFAS, salt and/or base, and water, the solution having a concentration of removed PFAS that is greater than a concentration of removed PFAS in the spent regenerant solution and the solution having a concentration of the salt and/or base that is greater than a concentration of the salt and/or base in the spent regenerant solution; and subjecting the solution comprising removed PFAS, salt and/or base, and water to a super-loading recovery process in which removed PFAS is adsorbed onto additional anion exchange resin in an anion exchange vessel to create an ultra-concentrated PFAS waste product.

16. The method of claim 15 in which the PFAS is removed from the anion exchange resin in the anion exchange vessel by a dual mechanism including desorption and anion exchange.

17. The method of claim 16 in which the desorption includes providing a concentration of a solvent configured to displace hydrophobic tails of the PFAS on the backbone of the anion exchange resin in the anion exchange vessel with the solvent and providing a concentration of anions configured to displace hydrophilic heads of the PFAS with the anions.

18. The method of claim 15 in which the solvent includes an alcohol.

19. The method of claim 18 in which the regenerant solution includes about 50% to about 70% methanol by volume, about 2% to about 28% water by volume, and about 1% to about 5% salt or base by weight.

20. The method of claim 19 in which the regenerant solution includes about 70% methanol by volume, about 28% water by volume and about 2% salt or base by weight.

21. The method of claim 15 in which the anion exchange resin in the anion exchange vessel includes a macro-porous, strong base, anion exchange resin.

22. The method of claim 15 in which the separation and recovery process is configured to maximize recovery of regenerant solution and minimize volume of concentrated desorbed PFAS.

23. The method of claim 15 in which the separation and recovery process includes one or more of evaporation, distillation, and/or membrane separation.

24. The method of claim 23 in which the separation and recovery process includes one or more of evaporation and/or distillation, and in which the evaporation and/or distillation includes condensing the spent regenerant solution.

25. The method of claim 23 in which the separation and recovery process includes removing carryover PFAS to provide a purified reclaimed solvent.

26. The method of claim 15 in which subjecting the solution comprising removed PFAS, salt and/or base, and water to the super-loading recovery process further creates a solution of the salt and/or base and the water having a concentration of the salt and/or base that is greater than a concentration of the salt and/or base in the solution comprising removed PFAS, salt and/or base, and water.

27. The method of claim 15, wherein the PFAS comprises at least one perfluoroalkyl substance.

28. The method of claim 15, wherein the PFAS comprises at least one polyfluoroalkyl substance.

29. The method of claim 15, wherein the PFAS comprises at least one perfluoroalkyl substance and at least one polyfluoroalkyl substance.

30. The method of claim 15, wherein the PFAS is perfluorooctanoic acid (PFOA).

\* \* \* \* \*